(12) United States Patent
Gleason et al.

(10) Patent No.: US 11,183,770 B2
(45) Date of Patent: Nov. 23, 2021

(54) DUAL POLARIZATION RF ANTENNA FEED MODULE AND PHOTONIC INTEGRATED CIRCUIT (PIC)

(71) Applicant: Raytheon Company, Waltham, MA (US)

(72) Inventors: Benn Gleason, Tucson, AZ (US); Sean D. Keller, Tucson, AZ (US); Gerald P. Uyeno, Tucson, AZ (US); John P. Gianvittorio, Venice, CA (US); Larry C. Martin, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 382 days.

(21) Appl. No.: 16/415,821

(22) Filed: May 17, 2019

(65) Prior Publication Data

US 2020/0365998 A1 Nov. 19, 2020

(51) Int. Cl.
*H01Q 3/26* (2006.01)
*H01Q 21/00* (2006.01)
*G02F 1/01* (2006.01)
*H01Q 9/04* (2006.01)

(52) U.S. Cl.
CPC ......... *H01Q 21/0006* (2013.01); *G02F 1/011* (2013.01); *H01Q 3/2676* (2013.01); *H01Q 9/0435* (2013.01); *G02F 2203/07* (2013.01); *G02F 2203/50* (2013.01)

(58) Field of Classification Search
CPC ............. H01Q 21/0006; H01Q 9/0435; H01Q 3/2676; H01Q 21/065; G02F 1/011; G02F 2203/50; G02F 2203/07; G02F 1/0134; G02F 1/035; G02F 1/0353
See application file for complete search history.

(56) References Cited

U.S. PATENT DOCUMENTS

| 5,333,000 | A | * | 7/1994 | Hietala | G02F 2/02 |
| | | | | | 342/368 |
| 5,856,805 | A | * | 1/1999 | Page | H01Q 3/2676 |
| | | | | | 342/375 |
| 5,859,611 | A | * | 1/1999 | Lam | H04B 10/2914 |
| | | | | | 342/368 |
| 6,124,827 | A | * | 9/2000 | Green | H01Q 3/22 |
| | | | | | 342/157 |
| 9,614,280 | B2 | * | 4/2017 | Shi | H01Q 3/2682 |
| 10,686,523 | B1 | * | 6/2020 | Gleason | H01Q 21/293 |
| 2003/0202794 | A1 | * | 10/2003 | Izadpanah | H01Q 3/2676 |
| | | | | | 398/115 |
| 2004/0208642 | A1 | * | 10/2004 | Chen | H04B 10/5055 |
| | | | | | 398/186 |

(Continued)

OTHER PUBLICATIONS

Stulemeijer, J., "Photonic Integrated Beamformer for a Phased Array Antenna," ECOC '98, Sep. 20-24, 1998, Madrid Spain.

(Continued)

*Primary Examiner* — Seokjin Kim
(74) *Attorney, Agent, or Firm* — Schwegman Lundberg & Woessner, P.A.

(57) ABSTRACT

An RF antenna feed module uses an optical feed network and photo-detectors to generate RF feed signals to drive a dual polarization RF antenna to produce an RF beam with a variable polarization state. The optical feed network and suitably the photo-detectors are monolithically fabricated PIC. Multiple modules may be configured to drive a dual polarization RF phased array. A single feed module can produce RF feed signals over a frequency range of at least 300 GHz.

20 Claims, 5 Drawing Sheets

(56) References Cited

U.S. PATENT DOCUMENTS

| | | | | |
|---|---|---|---|---|
| 2007/0206958 A1* | 9/2007 | Chen | .................... | H01Q 3/2676 |
| | | | | 398/183 |
| 2009/0324250 A1* | 12/2009 | Chen | ..................... | H04B 10/00 |
| | | | | 398/182 |
| 2010/0054761 A1* | 3/2010 | Chen | ..................... | H04B 10/60 |
| | | | | 398/212 |
| 2019/0068282 A1* | 2/2019 | Neuman | ............ | H04B 7/18515 |
| 2020/0153094 A1* | 5/2020 | Murakowski | .......... | H01Q 21/24 |
| 2020/0373662 A1* | 11/2020 | Gleason | ................ | G01S 13/426 |
| 2021/0006333 A1* | 1/2021 | Morton | ................ | H01Q 3/2676 |

OTHER PUBLICATIONS

Behrooz et al., "A 21-D Heterodyne Lens-Free Optical Phased Array Camera with Reference Phase Shifting," ILLL Photonics Journal, vol. 10, No. 5, Sep. 2018.

Fatemi et al., "A Low Power PWM Optical Phased Array Transmitter with 16° Field-of-View and 0.8° Beamwidth," 2018 IEEE Radio Frequency Integrated Circuit Symposium.

Fatemi et al., "A Nonuniform Sparse 2-D Large-FOV Optical Phased Array With a Low-Power PWM Drive," 2019 IEEE, IEEE Journal of Solid State Circuits.

Analog Photonics, "APSUNY Process Development Kit Full-Build Component Library Documentation," Sponsored by AIM Photonics Institute, copyright 2017.

Kohno et al., "Ghost imaging using a large-scale silicon photonic phased array chip," Optics Express 3817, vol. 27, No. 3, Feb. 4, 2019.

Jung et al., "High efficiency low threshold current 1.3 μm InAs quantum dot lasers on on-axis (001) GaP/Si," Applied Physics Letters III, 122107 (2017).

* cited by examiner

DUAL POLARIZATION RF ANTENNA FEED MODULE AND PHOTONIC INTEGRATED CIRCUIT (PIC)

BACKGROUND OF THE INVENTION

Field of the Invention

This invention relates to dual polarization RF antennas and phased array antennas and more particularly to the use of a Photonic Integrated Circuit (PIC) that provides a dual polarization RF antenna feed module.

Description of the Related Art

RF transmitters are used to broadcast signals for such applications as radio and televisions, establish bi-directional communications such as between cell phones and as part of radar systems. The RF (microwave) spectrum extends to 300 GHz with 0-30 GHz representing conventional RF applications and 30-300 GHz referred to as millimeter wave (MMW). The RF transmitter generates an electrical feed signal a desired RF reference frequency that drives an RF antenna to broadcast the RF beam.

The polarization of an antenna refers to the orientation of the e-field vector with respect to the direction of propagation and is determined by the physical structure of the antenna and by its orientation. Polarization is generally defined using one of three states: elliptical, linear or circular. In elliptical, the tip of the electric field vector traces out an ellipse over time. In linear polarization the ellipse collapses into a straight line, and in circular polarization e two axes of the ellipse are equal. In linear polarization the electric field oscillates back and forth along one direction. Circular or elliptically polarized radio waves are designated as right-handed or left-handed to describe the angular direction the tip of the electric field vector rotates. Dual Polarization antennas are used to transmit or receive a wave with rotating polarization (elliptical/circular) or to provide access to polarizations at right angles (vertical "V" and horizontal "H") to each other. A dual polarization RF antenna may be formed as two linearly polarized RF antennas with polarization axes oriented orthogonally to each other or a single RF antenna with two RF feeds, capable of broadcasting two linear polarization states with polarization axes orthogonal to each other.

One type of RF transmitter is known as a "phased array", a computer-controlled array of antennas that creates a beam of RF waves that can be electronically steered to point in different directions without moving the antennas. In a phased array, the RF electrical feed signal is fed to the individual antennas with the correct phase relationship so that the RF waves from the separate antenna add together to increase the radiation in a desired direction, while cancelling to suppress radiation in undesired directions. The power from the transmitter is fed to the antennas through devices called phase shifters, controlled by the computer system, which can alter the phase electronically, thus steering the beam of RF waves to a different direction. Phased arrays typically comprises many small antennas (sometimes thousands) to achieve high gain.

Figure 1:
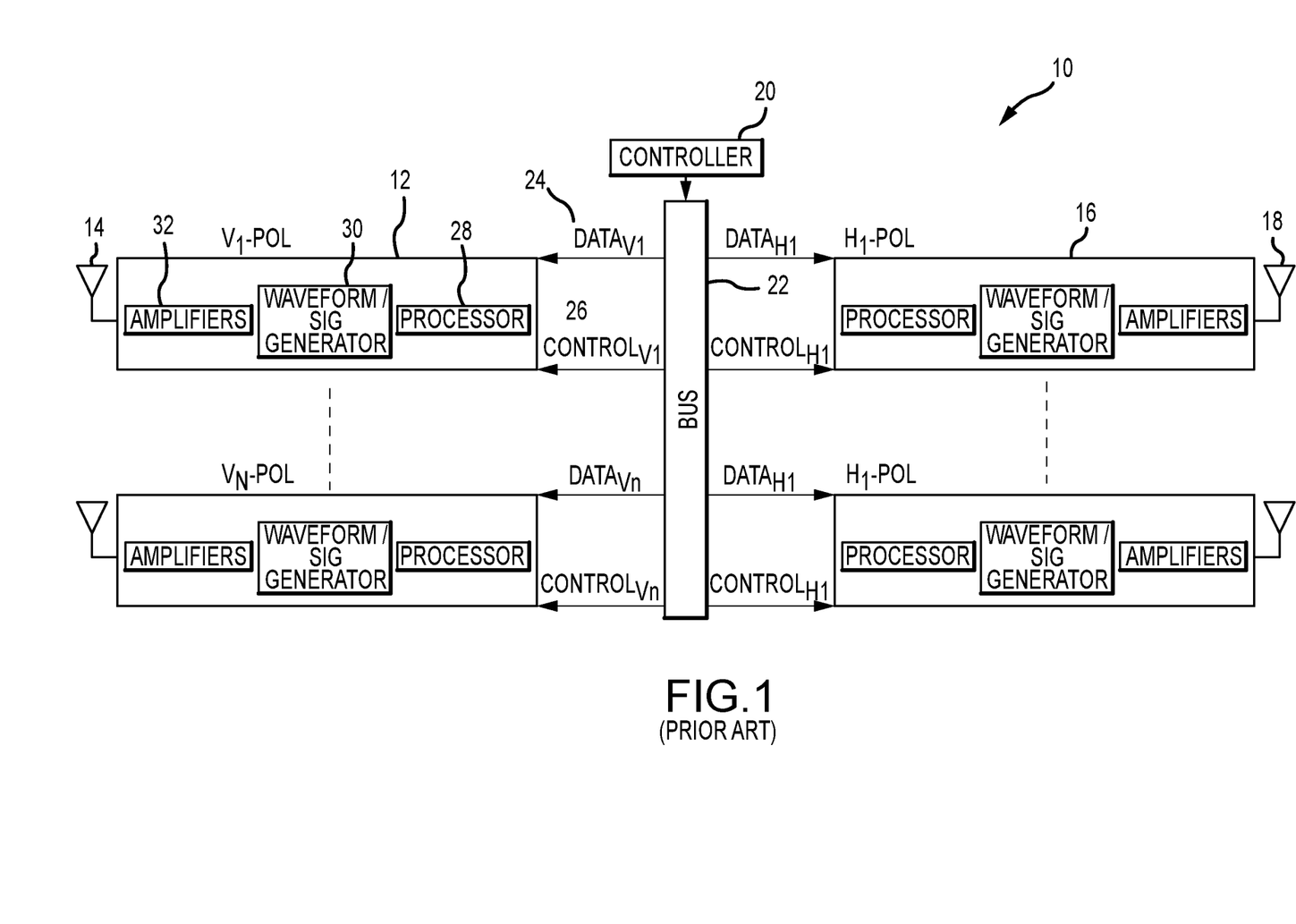
FIG. 1, as described above, is a block diagram of a dual polarization RF phased array.

FIG. 1 illustrates an embodiment of a dual polarization RF phased array 10. Each element of the phased array now includes a beamforming network 12 and RF antenna element 14 for V-pol and a beam forming network 16 and RF antenna element 18 that together form an RF wave with a specified polarization. A controller 20 and an internal bus 22 provide Data 24 e.g. the RF input signal and Control 26 e.g. phase modulation and polarization state to each of the beam forming networks 12. Each beamforming network 12 includes a processor 28 that controls a waveform/signal generator 30 to generate an RF waveform with the correct phase amplitude and an amplifier 32 that amplifies the RF waveform. The processor 28, waveform/signal generator 30 and amplifier 32 are RF components.

A drawback to phased RF phased arrays is the large volume and weight of the RF-electronic beamforming network. This problem is overcome using an optical feed network to provide the RF electrical feed signals. The principle of operation uses a coherent detection scheme to directly transfer the phase and amplitude of an optical signal to a microwave signal by mixing this signal with an optical local oscillator (LO) signal. If the optical frequency of the LO signal differs by 10 GHz from the input signal than a 10 GHz microwave signal with the same phase as the optical signal will be obtained after combination and detection of the two signals. In this way, modulation of phase and amplitude of a microwave signal can be performed using optical phase and amplitude modulators, which are much smaller than their counterpart RF devices. An optical chip known as a "photonic integrated circuit" (PIC) has two inputs for two optical signals with a 10 GHz frequency difference, one of which is modulated with the radar pulse. The two inputs are fed to a 2×16 power splitting network, the outputs of which are stored in pairs. Each pair is connected to a phase and amplitude modulation section, after which the two signals are fed to a 3-dB coupler. The RF-signals are obtained by coupling the signals coming out of the sixteen 3-dB couplers to a series of 16 discrete optical detectors off-chip. See "Photonic Integrated Beamformer for a Phased Array Antenna" J. Stulemeijer, et. al. ECOC '98, 20-24 Sep. 1998 Madrid, Spain and "Radiofrequency signal-generation system with over seven octaves of continuous tuning" Garret J Schneider, et.al. Nature Photonics, 20 Jan. 2013.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an RF antenna feed module that uses an optical feed network and photo-detectors to generate RF feed signals to drive a dual polarization RF antenna to produce an RF beam with a variable polarization state.

In an embodiment, a monolithically fabricated photonic integrated circuit (PIC) includes an optical feed network that modulates phase and amplitude components of a polarization state onto a pair of optical signals at frequencies $\omega 1$ and $\omega 2$ that differ in frequency by a desired RF frequency, combines the modulated optical signals and outputs first and second combined optical signals, each including phase and amplitude modulated components at frequencies $\omega 1$ and $\omega 2$. A pair of photo-detectors detects the combined optical signals and converts the optical signals to RF electrical feed signals at the desired RF frequency and polarization state.

In an embodiment, the optical feed network includes first and second optical waveguides configured to receive first and second optical signals at frequencies $\omega 1$ and $\omega 2$ having a frequency difference equal to a desired RF frequency. First and second optical waveguide 1:2 splitters split each of the first and second optical signals into first and second ω1 and first and second ω2 optical channel signals. A first electro-optical phase modulator responsive to polarization state phase command signals phase modulates one of the optical channel signals to define a phase component of the polarization state. A plurality of optical waveguide amplitude modulators responsive to polarization state amplitude command signals amplitude modulate ω1 and ω2 optical channel signals, respectively, to define an amplitude component of the polarization state. First and second optical waveguide 2:1 combiners combine the first ω1 and first ω2 optical channel signals to produce a first combined optical signal and combine the second ω1 and second ω2 optical channel signals to produce a second combined optical signal, respectively.

In an embodiment, the RF antenna feed module generates RF feed signals to drive an RF phased array to produce a steerable RF beam with a variable polarization state. The module includes optical waveguide splitters that split the first and second optical signals into an equal number of ω1 and ω2 optical channel signals. Electro-optical phase modulators responsive to steering command signals phase modulate the ω1 optical channel signals to steer the dual polarization RF beam. Each channel comprises an optical feed network and photo-detectors to generate the RF feed signals that define the polarization state for that channel. In an embodiment, all of the optical components and the photo-detectors for all of the channels are monolithically fabricated on a PIC.

These and other features and advantages of the invention will be apparent to those skilled in the art from the following detailed description of preferred embodiments, taken together with the accompanying drawings, in which:

DETAILED DESCRIPTION OF THE INVENTION

The present invention describes an RF antenna feed module that uses an optical feed network and photo-detectors to generate RF feed signals to drive a dual polarization RF antenna to produce an RF beam with a variable polarization state. A monolithically fabricated PIC includes an optical feed network that modulates phase and amplitude components of a polarization state onto a pair of optical signals at frequencies ω1 and ω2 that differ in frequency by a desired RF frequency, combines the modulated optical signals and outputs first and second combined optical signals, each including phase and amplitude modulated components at frequencies ω1 and ω2. A pair of photo-detectors detects the combined optical signals and converts the optical signals to RF electrical feed signals at the desired RF frequency and polarization state.

Polarization can be defined as the shape that the tip of the electric field vector outlines in any fixed plane that intersects and is normal to the direction of propagation. Linear polarization therefore describes a line traced our by the electrical field vector in this intersecting plane. The resulting shape can be described as the combination of two linear orthogonal states, each with independent phase and amplitude components. If the phase difference between these two states is zero or +/−180 degrees, the resulting polarization will be linear. If the phase difference between the two components is non-zero, the resulting polarization will be elliptical. If the phase delay between the two states is exactly +/−90 degrees, the resulting polarization is circular. It should be noted that circular and linear polarization are special cases of elliptical polarization. The optical feed network is capable of providing a time-varying and arbitrary polarization state for a single RF antenna or an RF phased array from a single PIC.

The use of optical elements to create wideband RF signals benefits from the fact that a large change in RF frequency is still a very small change in the optical domain. For example a dual polarization electrical feed that generates both a 2 GHz and 18 GHz signal often requires two sets of electronics for each polarization. That is 4 total sets of electronics for V and H polarization 2 GHz and 18 GHz. The same set of optical components processes the 2 GHz and 18 GHz signals because the difference in the RF signals is a difference of less than 0.2 nm in the optical signals. More generally, the same set of optical components can process RF signals in which the difference in RF frequency is less than 300 GHz, and the difference in wavelength of the optical signals is less than 3 nm to generate both the V and H pol RF signals at the different RF frequencies. Therefore there is a SWaP savings by reducing the number of components, and because the optical system itself is lower SWaP.

Figure 2:
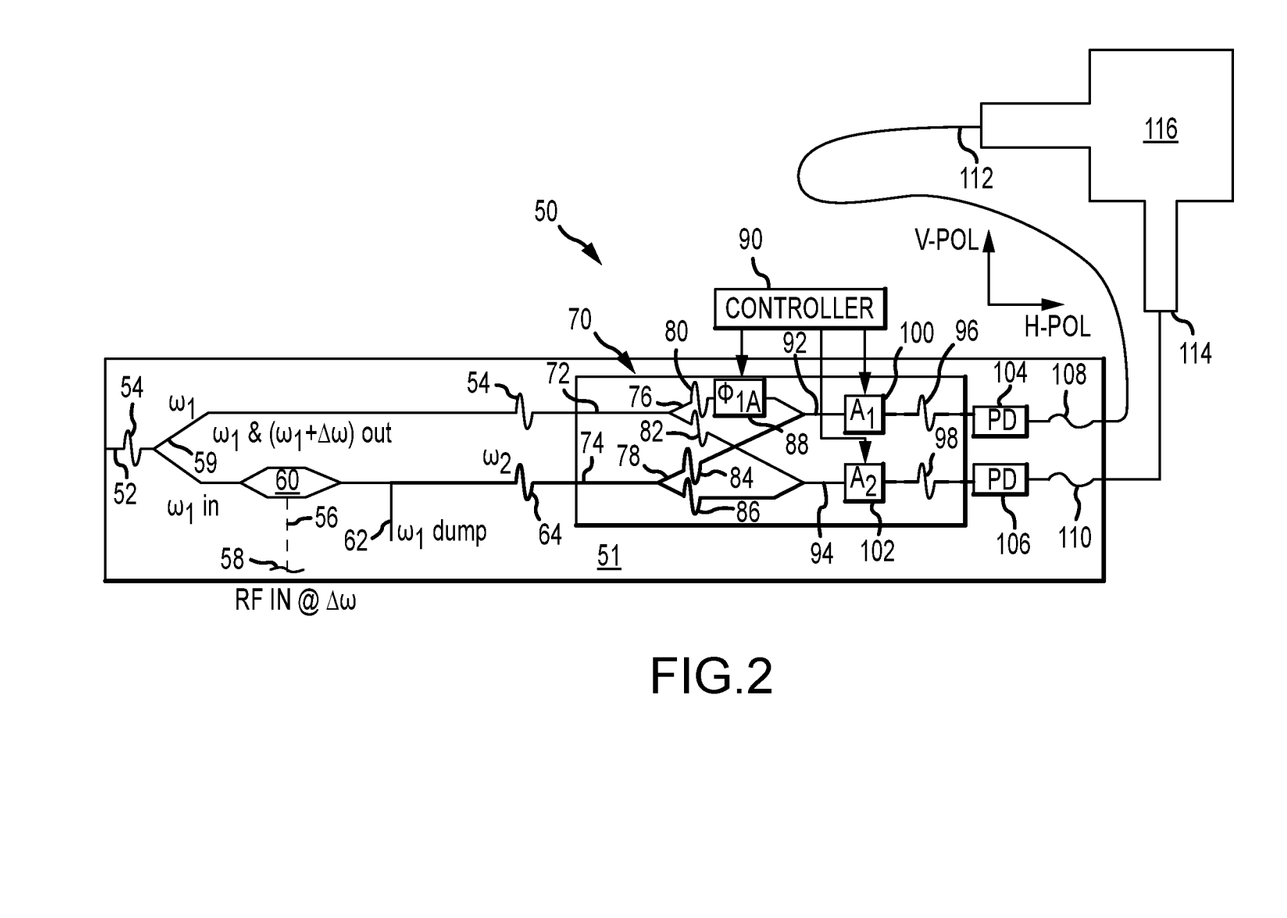
FIG. 2 is a block diagram of an RF antenna feed module that uses an optical feed network to generate RF feed signals to drive a dual polarization RF antenna to produce an RF beam with a variable polarization state.

Referring now to FIG. 2, an embodiment of an RF antenna feed module 50 on a PIC 51 includes an optical input 52 for receiving a first optical signal 54 at frequency ω1 and an electrical input 56 for receiving an RF signal 58 at an RF frequency Δω. An optical waveguide 1:2 splitter 59 splits optical input 52 along two paths. An optical modulator 60 in the second path modules the optical signal at frequency ω1 with the RF signal at frequency Δω to produce an optical signal including both the ω1 frequency component and a ω1 plus Δω component. The ω1 component is directed to an optical dump 62 leaving only a ω2 optical signal 64. The frequency difference of the ω1 and ω1 optical signals being equal to the RF frequency. Alternately, both optical signals could be generated off-chip.

An optical feed network 70 on PIC 51 includes first and second optical waveguides 72 and 74 configured to receive first and second optical signals 54 and 64. First and second optical waveguide 1:2 splitters 76 and 78 are coupled to the first and second optical waveguides, 72 and 74 respectively, and configured to split each of the first and second optical signals 54 and 64 into first and second ω1 optical channel signals 80 and 82 and first and second ω2 optical channel signals 84 and 86. A first electro-optical phase modulator 88 responsive to polarization state phase command signals from a computer-implemented controller 90 phase modulates one of the optical channel signals (e.g. optical channel signal 80) to define a phase component of the polarization state. In alternate embodiments, different configurations of multiple phase modulators can be used on the channel signals to implement the phase component. First and second optical waveguide 2:1 combiners 92 and 94 combine the first ω1 and first ω2 optical channel signals 80 and 84 to produce a first combined optical signal 96 and combine the second ω1 and second ω2 optical channel signals 82 and 86 to produce a second combined optical signal 98. A plurality of optical waveguide amplitude modulators 100 and 102 responsive to polarization state amplitude command signals from controller 90 amplitude modulate ω1 and ω2 optical channel signals, respectively, to define an amplitude component of the polarization state. In this embodiment, the optical channel signals are addressed by amplitude modulating the combined optical signals. In other embodiments, optical channel signals may be separately modulated.

First and second photo-detectors 104 and 106 are configured to detect the first and second combined optical signals 96 and 98, respectively, and generate first and second RF electrical feed signals 108 and 110 at the desired RF frequency that together define the polarization state. The photo-detectors are suitably monolithically fabricated on PIC 51. In alternate embodiments, the photo-detectors may be provided as discrete devices.

RF electrical feed signals 108 and 110 to RF feeds 112 and 114, respectively, of a dual polarization RF antenna 116 to transit an RF beam with a variable polarization state. The dual polarization RF antenna may be formed as two linearly polarized RF antennas with polarization axes oriented orthogonally to each other or a single RF antenna with two RF feeds, capable of broadcasting two linear polarization states with polarization axes orthogonal to each other.

Figure 3:
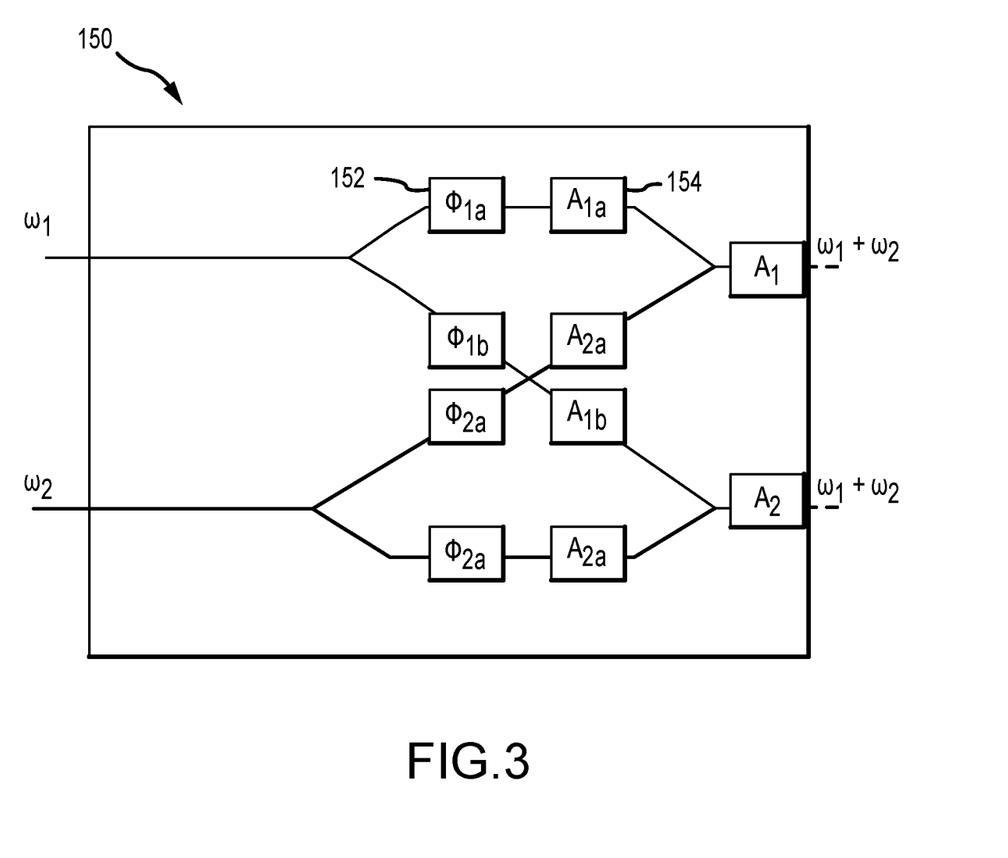
FIG. 3 is a block diagram of an RF antenna feed module illustrating alternative phase and amplitude modulator configurations to provide the variable polarization state.

Referring now to FIG. 3, an embodiment of an optical feed network 150 illustrates alternate configurations for implementing the phase and amplitude modulation of the optical channel signals to define the phase and amplitude components of the polarization state. To implement the phase component, phase modulators 152 may be positioned (1) only on one channel of ω1 after the split, (2) only on one channel of ω2 after the split, (3) both channels of ω1 after the split, (4) both channels of ω2 after the split or (5) one channel each of ω1 and ω2 after the split. To implement the amplitude component, amplitude modulators 154 may be positioned (1) on the combined channel, one per polarization channel (two amplitude modulators) or (2) on each ω1 and ω2 channel (four amplitude modulators).

Referring now to FIGS. 4a-4e, the optical feed network can support the generation of a time varying polarization state of any arbitrary polarization for which a few representative examples are given. Without loss of generalization, the two orthogonal components of the polarization state are referred to as the vertical "V" and horizontal "H" components of the electric "E" field of the RF beam. The polarization state is represented by a "polarization ellipse" for which linear and circular are special cases.

Figure 4A:
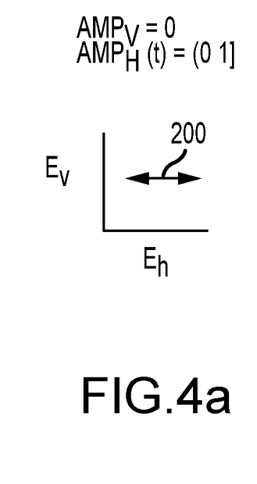
FIGS. 4a through 4e are examples of polarization states supported by the RF antenna feed module.

As shown in FIG. 4a, the optical feed network is configured to set the amplitude of the V component to zero ($Amp_V=0$) and the amplitude of the H component to a non-zero value between 0 and 1 ($Amp_H(t)=(0\ 1]$). The resulting polarization state is a linear H polarization 200. When one amplitude component is set to zero, the relative phase, hence phase modulation has no meaning and is irrelevant.

Figure 4B:
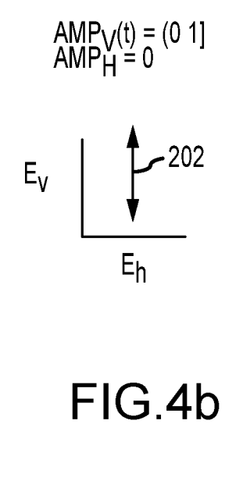

As shown in FIG. 4b, the optical feed network is configured to set the amplitude of the H component to zero ($Amp_H=0$) and the amplitude of the V component to a non-zero value between 0 and 1 ($Amp_V(t)=(0\ 1]$). The resulting polarization state is a linear V polarization 202.

Figure 4C:
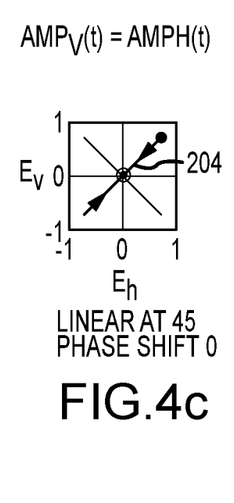

As shown in FIG. 4c, the optical feed network is configured to make the H and V amplitude components equal ($Amp_H(t)=Amp_V(t)$) and both within (0 1] with a relative phase shift of 0 degrees. The resulting polarization state is a linear polarization 204 at 45 degrees. Maintaining a zero relative phase shift while changing the ratio of the amplitude components would change the angle of the linear polarization.

Figure 4D:
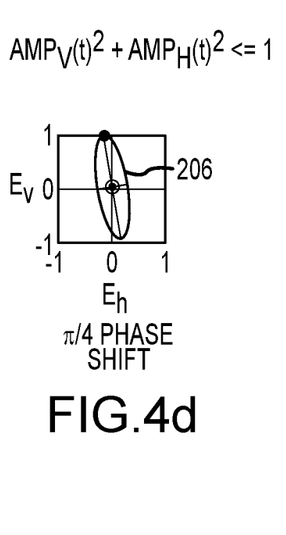

As shown in FIG. 4d, the optical feed network is configured to make the H and V amplitude components satisfy ($Amp_H(t)^2+Amp_V(t)^2 \leq 1$) and both within (0 1] with a relative phase shift of $\pi/4$ degrees. The resulting polarization state is an elliptical polarization 206. The relative lengths of the major and minor axis of the ellipse are determined by the relative H and V amplitude components. The tilt of the ellipse is determined by the phase shift.

Figure 4E:
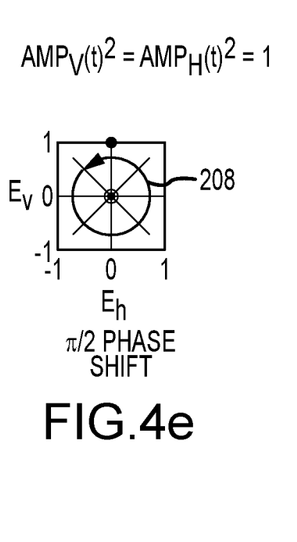

As shown in FIG. 4e, the optical feed network is configured to make the H and V amplitude components satisfy ($Amp_H(t)^2+Amp_V(t)^2=1$) and both within (0 1] with a relative phase shift of $7c/2$ degrees. The resulting polarization state is a circular polarization 208.

Figure 5:
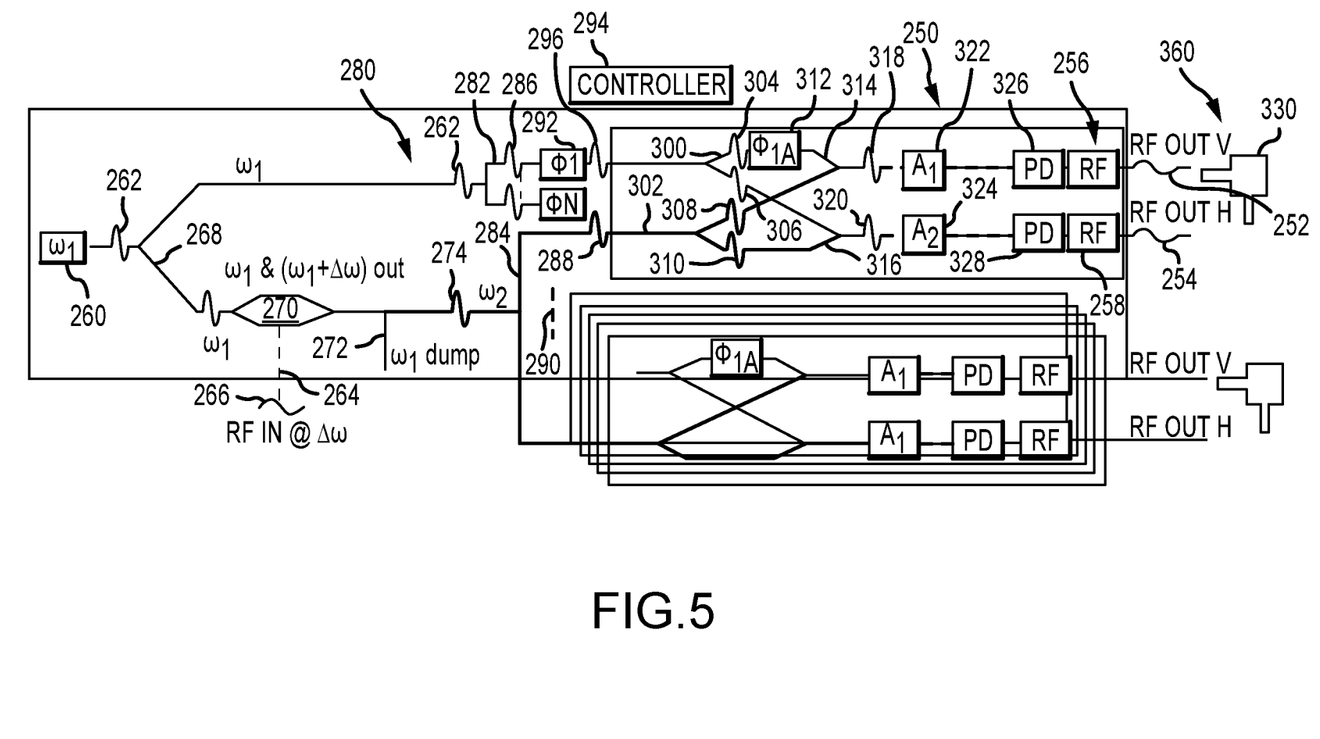
FIG. 5 is a block diagram of an RF antenna feed module that uses an optical feed network to generate RF feed signals to drive a dual polarization RF phased array to produce a steerable RF beam with a variable polarization state.

Referring now to FIG. 5, an embodiment of RF antenna feed module 250 generates RF feed signals (RF out V 252, RF out H 254) to drive a dual polarization RF phased array 256 to produce a steerable RF beam with a variable polarization state. Different levels of integration are possible for module 250. In this embodiment, the entire module 250 is monolithically fabricated on a single PIC. Alternatively, the optical feed network and possibly the photo-detectors for each channel may be monolithically fabricated on a single PIC.

RF antenna feed module 250 includes an on-chip laser source 260 for generating a first optical signal 262 at frequency ω1. The laser source can be grown directly onto the PIC with an active material such as III-V material or with quantum dots. An electrical input 264 receives an RF signal 266 at an RF frequency Δω. In this configuration, the only inputs are RF in and DC power. An optical waveguide 1:2 splitter 268 splits optical input 262 along two paths. An optical modulator 270 in the second path modules the optical signal at frequency ω1 with the RF signal at frequency Δω to produce an optical signal including both the ω1 frequency component and a ω1 plus Δω component. The ω1 component is directed to an optical dump 272 leaving only a ω2 optical signal 274. The frequency difference of the ω1 and ω1 optical signals being equal to the RF frequency. Alternately, both optical signals could be generated off-chip.

A beam forming network 280 includes first and second optical waveguide splitters 282 and 284 configured to split each of the first and second optical signals 262 and 274 into an equal number of ω1 and ω2 optical channel signals 286 and 288 in respective channels 290. A plurality of electro-optical phase modulators 292 responsive to steering command signals from a computer-implemented controller 294 phase modulate the ω1 optical channel signals 286, respectively, to produce phase-shifted ω1 optical channel signals 296.

Each channel 290 includes first and second optical waveguide 1:2 splitters 300 and 302 configured to split the phase-modulated ω1 and the ω2 optical channel signals 296 and 288 into first and second ω1 optical sub-channel signals 304 and 306 and first and second ω2 optical sub-channel signals 308 and 310. A first electro-optical phase modulator 312 responsive to polarization state phase command signals from computer-implemented controller 294 phase modulates one of the optical sub-channel signals (e.g. optical sub-channel signal 304) to define a phase component of the polarization state. In alternate embodiments, different configurations of multiple phase modulators can be used on the channel signals to implement the phase component. First and second optical waveguide 2:1 combiners 314 and 316 combine the phase-modulated first ω1 and first ω2 optical sub-channel signals 304 and 308 to produce a first combined optical channel signal 318 and combine the second ω1 and second ω2 optical channel signals 306 and 310 to produce a second combined optical channel signal 320. A plurality of optical waveguide amplitude modulators 322 and 324 responsive to polarization state amplitude command signals from controller 294 amplitude modulate ω1 and ω2 optical sub-channel signals, respectively, to define an amplitude component of the polarization state. In this embodiment, the optical sub-channel signals are addressed by amplitude modulating the combined optical channel signals. In other embodiments, optical sub-channel signals may be separately modulated. First and second photo-detectors 326 and 328 are configured to detect the first and second combined optical signals 318 and 320, respectively, and generate first and second RF electrical feed signals RF out V 252 and RF out H 254 at the desired RF frequency that together define the polarization state. Additional RF processing such as electrical low noise amplifiers (LNAs) or filters, designated as RF 256 and 258 can be applied to the feed signals. These electrical devices may be discrete or integrated on the PIC. The feed signals RF out V and RF out H drive dual polarization antenna elements 330 that together form RF phased array 260 to produce the steerable RF beam with a time-varying and arbitrary polarization state.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An RF antenna feed module that generates RF feed signals to drive a dual polarization RF antenna to produce an RF beam with a variable polarization state, comprising:
    first and second optical waveguides configured to receive first and second optical signals at frequencies ω1 and ω2 having a frequency difference equal to a desired RF frequency;
    first and second optical waveguide 1:2 splitters coupled to the first and second optical waveguides, respectively, and configured to split each of the first and second optical signals into first and second ω1 and first and second ω2 optical channel signals;
    a first electro-optical phase modulator responsive to polarization state phase command signals to phase modulate one of the optical channel signals to define a phase component of the polarization state;
    a plurality of optical waveguide amplitude modulators responsive to polarization state amplitude command signals to amplitude modulate ω1 and ω2 optical channel signals, respectively, to define an amplitude component of the polarization state;
    first and second optical waveguide 2:1 combiners that combine the first ω1 and first ω2 optical channel signals to produce a first combined optical signal and combine the second ω1 and second ω2 optical channel signals to produce a second combined optical signal, respectively; and
    first and second photo-detectors configured to detect the first and second combined optical signals and generate first and second RF electrical feed signals at the desired RF frequency that together define the polarization state.

2. The RF antenna feed module of claim 1, wherein all of the optical components including the waveguides, optical waveguide 1:2 splitters, electro-optical phase modulator, optical waveguide amplitude modulators and optical waveguide 2:1 combiners are monolithically fabricated on a photonic integrated circuit (PIC).

3. The RF antenna feed module of claim 1, wherein the photo-detectors are monolithically fabricated on the PIC.

4. The RF antenna feed module of claim 1, wherein the first electro-optic phase modulator and the plurality of optical waveguide amplitude modulators are responsive to polarization state phase and amplitude command signals, respectively, to generate a time-varying polarization state having any specified elliptical polarization.

5. The RF antenna feed module of claim 1, further comprising:
    a second electro-optical phase modulator responsive to polarization state phase command signals to phase modulate another one of the optical channel signals in a push-pull configuration with the first electro-optical phase modulator to define the phase component of the polarization state.

6. The RF antenna feed module of claim 1, wherein the plurality of optical waveguide amplitude modulators comprises first and second optical waveguide amplitude modulators positioned after the first and second optical waveguide 2:1 combiners, respectively, to amplitude modulate the first and second combined optical signals, respectively.

7. The RF antenna feed module of claim 1, in which the same feed module is configured to generate the RF beam with the variable polarization state at desired RF frequencies that span a frequency range of 300 GHz.

8. The RF antenna feed module of claim 1, further comprising first and second electrical processing elements positioned after the first and second photo-detectors, respectively, to amplify or filter the first and second RF electrical feed signals.

9. An RF antenna feed module that generates RF feed signals to drive a dual polarization RF antenna to produce an RF beam with a variable polarization state, comprising:
    a monolithically fabricated photonic integrated circuit (PIC) including
        an optical feed network that modulates phase and amplitude components of a polarization state onto a first and second optical signals at frequencies ω1 and ω2 that differ in frequency by a desired RF frequency and outputs first and second combined optical signals, each combined optical signal including phase and amplitude modulated components at frequencies ω1 and ω2; and
        first and second photo-detectors configured to detect the first and second combined optical signals, respectively, and generate first and second RF electrical feed signals at the desired RF frequency that together define the polarization state.

10. The RF antenna feed module of claim 9, wherein the optical feed network is responsive to polarization state phase and amplitude command signals to generate a time-varying polarization state having any specified elliptical polarization.

11. The RF antenna feed module of claim 9, wherein the optical feed network comprises:

first and second optical waveguide 1:2 splitters configured to split each of the first and second optical signals into first and second ω1 and first and second ω2 optical channel signals;

a first electro-optical phase modulator responsive to polarization state phase command signals to phase modulate one of the optical channel signals to define a phase component of the polarization state;

a plurality of optical waveguide amplitude modulators responsive to polarization state amplitude command signals to amplitude modulate ω1 and ω2 optical channel signals, respectively, to define an amplitude component of the polarization state; and first and second optical waveguide 2:1 combiners that combine the first ω1 and first ω2 optical channel signals to produce the first combined optical signal and combine the second ω1 and second ω2 optical channel signals to produce the second combined optical signal, respectively.

12. The RF antenna feed module of claim 11, in which the same feed module is configured to generate the RF beam with the variable polarization state at desired RF frequencies that span a frequency range of 300 GHz.

13. The RF antenna feed module of claim 11, further comprising first and second electrical processing elements positioned after the first and second photo-detectors, respectively, to amplify or filter the first and second RF electrical feed signals.

14. An RF antenna feed module that generates RF feed signals to drive a dual polarization RF phased array to produce a steerable RF beam with a variable polarization state, comprising:

first and second optical waveguides configured to receive first and second optical signals at frequencies ω1 and ω2 having a frequency difference equal to a desired RF frequency;

first and second optical waveguide splitters coupled to the first and second optical waveguides, respectively, and configured to split each of the first and second optical signals into an equal number of ω1 and ω2 optical channel signals in respective channels;

a plurality of electro-optical phase modulators responsive to steering command signals to phase modulate the ω1 optical channel signals, respectively, to produce phase-shifted ω1 optical channel signals;

each channel comprising;

first and second optical waveguide 1:2 splitters that split the phase-modulated ω1 and ω2 optical channel signals into first and second ω1 and ω2 optical sub-channel signals;

a first electro-optical phase modulator responsive to polarization state phase command signals to phase modulate one of the optical sub-channel signals to define a phase component of the polarization state;

a plurality of optical waveguide amplitude modulators responsive to polarization state amplitude command signals to amplitude modulate ω1 and ω2 optical sub-channel signals, respectively, to define an amplitude component of the polarization state;

first and second optical waveguide 2:1 combiners that combine the first ω1 and ω2 optical sub-channel signals to produce a first combined optical channel signal and combine the second ω1 and ω2 optical sub-channel signals to produce a second combined optical channel signal, respectively; and first and second photo-detectors configured to detect the first and second combined optical channel signals and generate first and second RF electrical feed signals at the desired RF frequency that together define the polarization state.

15. The RF antenna feed module of claim 14, wherein all of the optical components waveguides, optical waveguide splitters, electro-optical phase modulators, optical waveguide amplitude modulators and optical waveguide combiners are monolithically fabricated on a photonic integrated circuit (PIC).

16. The RF antenna feed module of claim 15, wherein the photo-detectors are monolithically fabricated on the PIC.

17. The RF antenna feed module of claim 14, wherein the first electro-optic phase modulator and the plurality of optical waveguide amplitude modulators for each channel are responsive to polarization state phase and amplitude command signals, respectively, to generate a time-varying polarization state having any specified elliptical polarization.

18. The RF antenna feed module of claim 14, in which the same feed module is configured to generate the RF beam with the variable polarization state at desired RF frequencies that span a frequency range of 300 GHz.

19. The RF antenna feed module of claim 14, wherein the plurality of optical waveguide amplitude modulators comprises first and second optical waveguide amplitude modulators positioned after the first and second optical waveguide 2:1 combiners, respectively, to amplitude modulate the first and second combined optical channel signals, respectively.

20. The RF antenna feed module of claim 14, further comprising first and second electrical processing elements positioned after the first and second photo-detectors, respectively, to amplify or filter the first and second RF electrical feed signals.

* * * * *

UNITED STATES PATENT AND TRADEMARK OFFICE
CERTIFICATE OF CORRECTION

PATENT NO. : 11,183,770 B2  
APPLICATION NO. : 16/415821  
DATED : November 23, 2021  
INVENTOR(S) : Gleason et al.

Page 1 of 1

It is certified that error appears in the above-identified patent and that said Letters Patent is hereby corrected as shown below:

In the Specification

In Column 6, Line 20, delete "$7c/2$" and insert --$\pi/2$-- therefor

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*